US005465847A

United States Patent [19]
Gilmore

[11] Patent Number: 5,465,847
[45] Date of Patent: Nov. 14, 1995

[54] REFUSE MATERIAL RECOVERY SYSTEM

[76] Inventor: Larry J. Gilmore, 17555 S.E. Braden, Gladstone, Oreg. 97027

[21] Appl. No.: 11,160

[22] Filed: Jan. 29, 1993

[51] Int. Cl.$^6$ ........................................ B07B 9/00
[52] U.S. Cl. ..................... 209/12.1; 209/31; 209/212; 209/630; 209/703; 209/930
[58] Field of Search ............. 209/3, 12.1, 44.1, 209/629, 630, 702, 703, 930, 30, 31, 36, 37, 234, 212

[56] References Cited

U.S. PATENT DOCUMENTS

| | | | |
|---|---|---|---|
| 3,643,797 | 2/1972 | Berkowitz et al. | 209/37 X |
| 4,139,454 | 2/1979 | Larson | 209/31 X |
| 5,009,370 | 4/1991 | Mackenzie | 209/630 X |
| 5,101,977 | 4/1992 | Roman | 209/31 X |
| 5,116,486 | 5/1992 | Pederson | 209/930 X |
| 5,137,621 | 8/1992 | Brown | 209/234 |
| 5,263,591 | 11/1993 | Taormina et al. | 209/630 |

FOREIGN PATENT DOCUMENTS

| | | | |
|---|---|---|---|
| 0033369 | 3/1977 | Japan | 209/930 |
| 2244014 | 11/1991 | United Kingdom | 209/630 |

*Primary Examiner*—William E. Terrell
*Assistant Examiner*—Tuan Nguyen
*Attorney, Agent, or Firm*—Robert L. Harrington

[57] ABSTRACT

A refuse material recovery system is shown and described including a blend of automatic material processing by size and density and manual separation or sorting procedures. Overall, the system optimizes recovery from refuse including municipal solid waste, commercial waste, commingled recyclables waste, and demolition waste. The system performs a primary size classification followed by ferrous separation steps, manual separation steps, and subsequent size classification steps. The process also provides separation by density, and eddy current method as well as air knife techniques. The system is further adapted to provide optional diversion capability to accommodate different end uses for recovered materials as a function of current market conditions. The system exhibits the desirable characteristics of efficiency, large capacity throughput, and cost effectiveness.

4 Claims, 5 Drawing Sheets

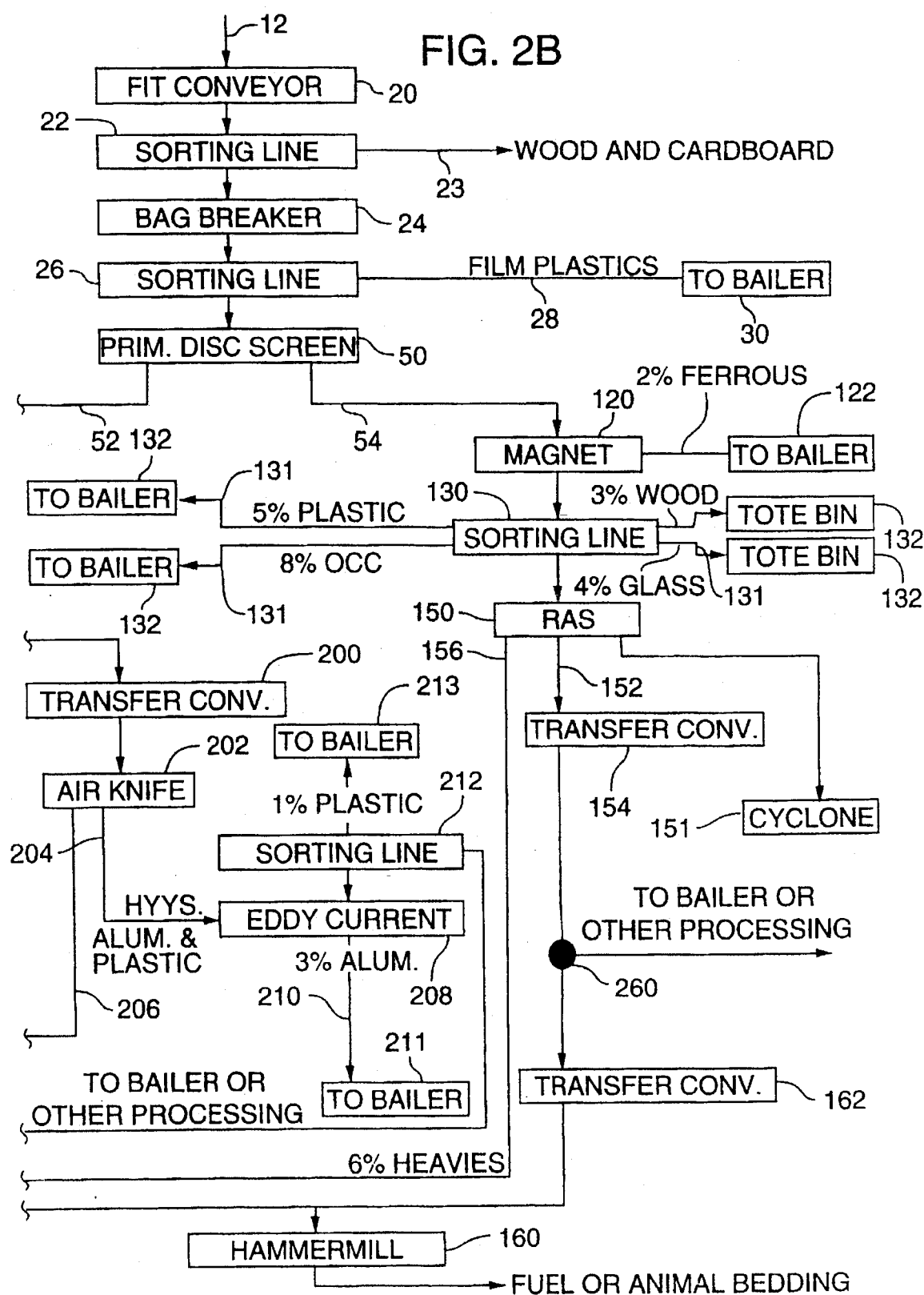

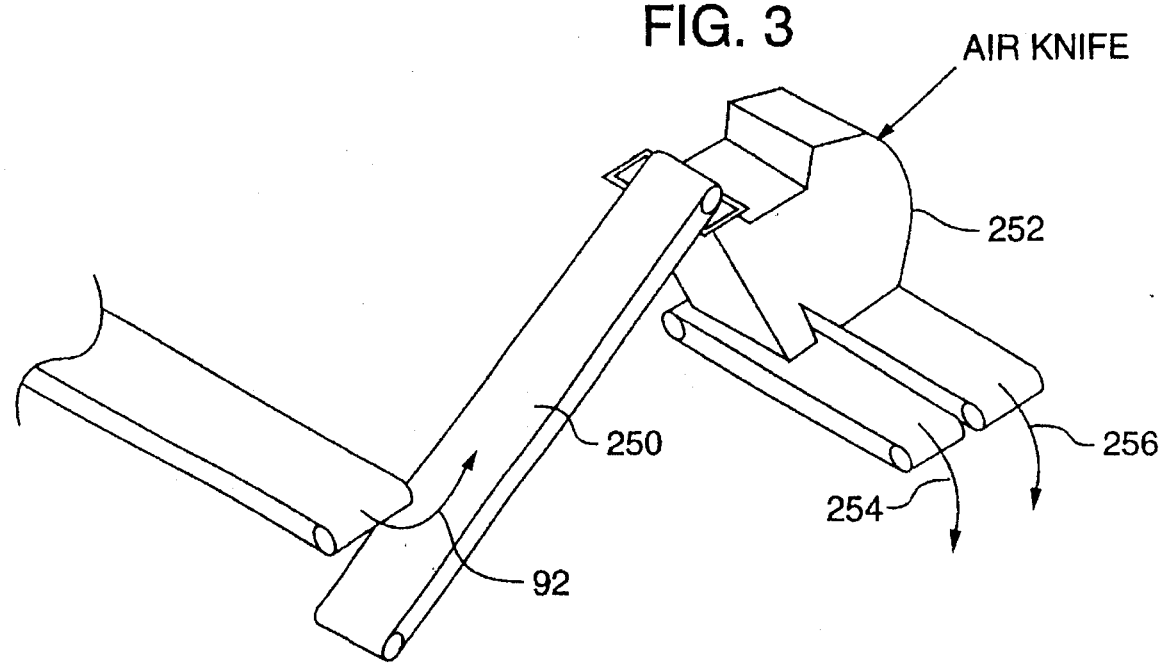
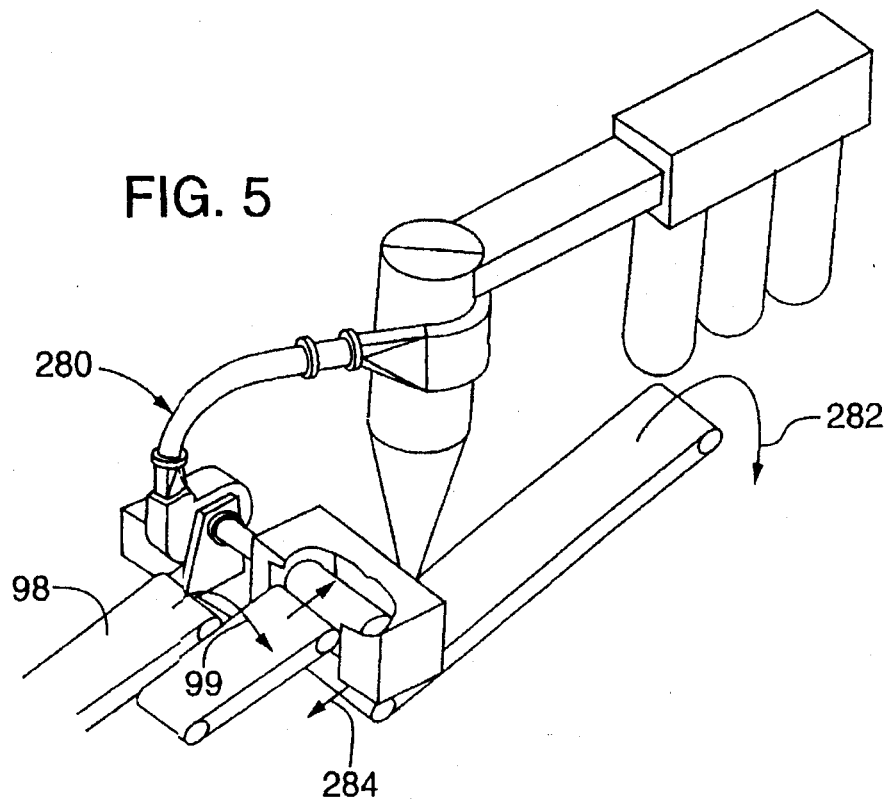

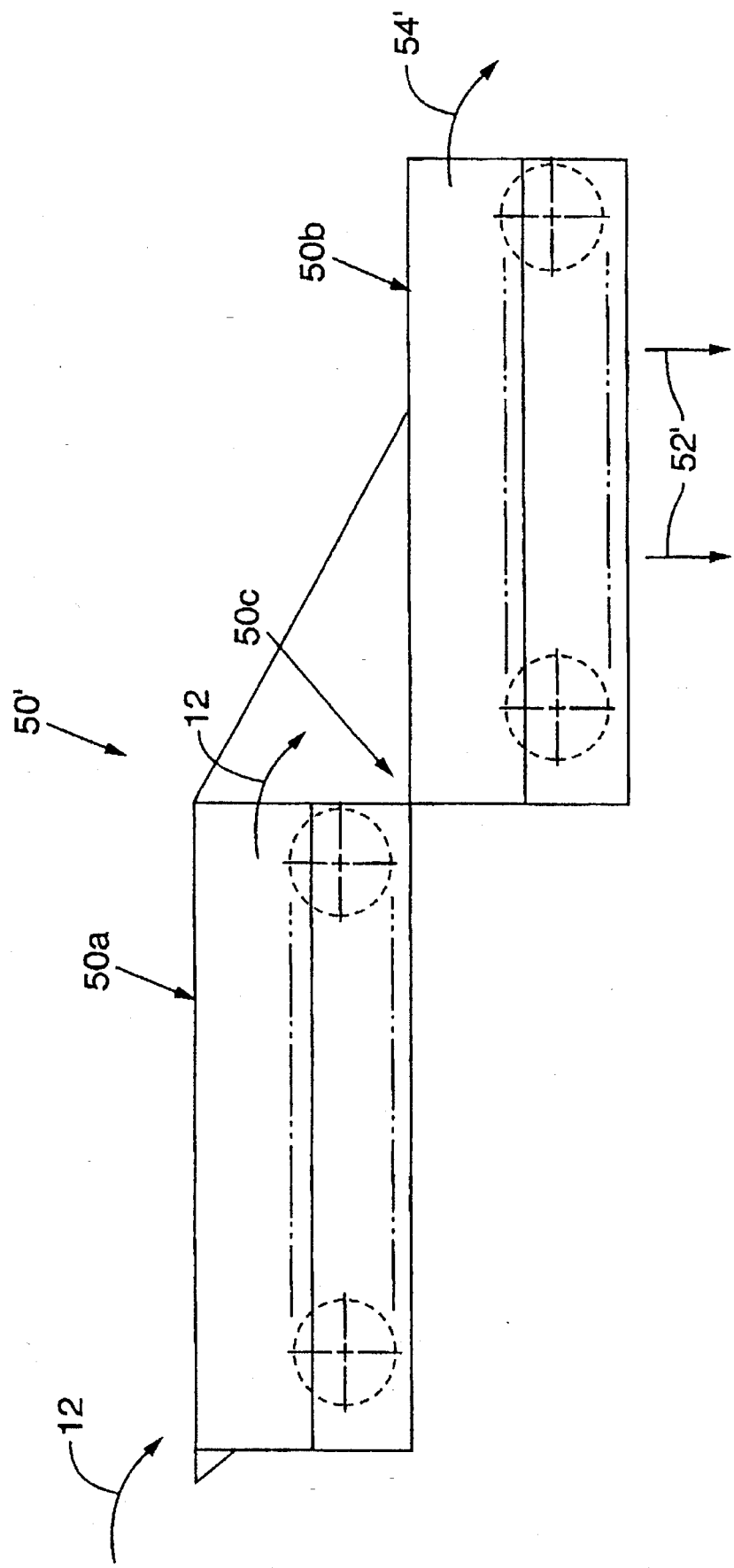

REFUSE MATERIAL RECOVERY SYSTEM

BACKGROUND OF THE INVENTION

The present invention relates generally to waste management, and particularly to a system for efficient, high capacity material recovery from a variety of sources including municipal solid waste, commercial waste, commingled waste, and demolition waste.

The recovery by one person of useable material from the refuse of another is as old as the practice of community waste collection and disposal. One persons's refuse has always had the potential to be another person's resource. The benefit of efficiently exploiting such wasted resources, however, grows as our population grows and our resources diminish.

Source separation of the recyclable or reusable items from the unusable refuse enhances our recovery of valuable resources, but requires extensive education of and effort by members of the public. In some areas, garbage collection services include curbside collection of pre-sorted recyclable materials, e.g., glass, metal, newspaper, and plastics, thereby avoiding any need to later separate such items. In other areas, the recyclables as a whole are separated from the unusable refuse, but are commingled and require later processing, i.e., for individual use as resources. Such curbside source separation and commingling of recyclable items as a method of material recovery is generally successful only in progressive, urban communities. In many large municipal areas, however, no source separation of any kind is practiced and reusable resources are mixed with unusable, undesirable, and contaminated waste. Extensive processing is required to recover the reusable resources. Such processing is the subject of the present invention.

As our natural resources diminish and our landfills expand to capacity, recovering valuable resources from our refuse and minimizing the volume of material committed to landfill burial become critical issues. This is particularly true in large cities where vast amounts of garbage are produced with little or no landfill capacity available, resulting in the undesirable transportation of garbage to the few remaining landfill sites. Also, many large cities have little hope of obtaining the cooperation of the local population in effective source separation.

Under early methods of material recovery, still practiced today, persons simply waited at a refuse dump site and picked through the garbage as it was delivered. For as long as there has been waste dumping sites, there have been persons sifting through the discarded material in search of recoverable or reusable items. As may be appreciated such methods of material recovery are neither organized nor efficient. For example, it is quite difficult, time consuming, or impossible to access items buried deep within the garbage pile. With transfer stations incorporated into waste collection systems, the opportunity to move refuse along a conveyor through a picking station permits recovery of some recyclables, but introduces a processing bottle-neck due to relatively low conveyor speed and reduced picking area material volume required to conduct such recovery. Adding large numbers of persons along expanded picking areas to improve system capacity only produces a labor intensive, and therefore inefficient, and large installation, and therefore expensive, solution.

According to a more recent material recovery approach, waste enters a processing system through an infeed conveyor and moves into an inclined trommel for size classification. The size classification merely separates the waste flow into large and small articles to aid in the subsequent manual separation of recoverable items from each of the resulting trommel output flows. Trommel output, i.e., unders and overs, moves into separate picking or sorting areas. As many as 150 people are then responsible for removing recoverables at the picking areas. Finally, the process ends with a ferrous removal station, e.g., large permanent magnet removing ferrous metals. The unrecovered material or unusable refuse is sent to a landfill. The basic system can be multiplied and operated in parallel, e.g., several trommels operating in parallel to provide the primary size classification. Unfortunately, this approach has proven to be expensive in relation to its capacity, typically processing only eight to ten tons of municipal solid waste per hour for a relatively large installation cost, e.g., on the order of eighty million dollars. Furthermore, trommels are expensive and relatively large items, requiring a relatively larger facility and associated greater real estate expense. Another deficiency of trommels as a size classification device is the undesirable breaking of glass articles. When a material recovery system breaks glass articles, the glass articles not only become unavailable for recycling, but also contaminate other portions of the material being processed. Finally, a trommel, basically a large inclined cylinder with material passing therethrough, tends to undesirably roll certain materials into balls which are essentially unrecoverable and tend to clog other portions of the material processing machinery if not removed. Thus, under this method of material recovery, the basic process of manual sorting is aided only by a primary size classification step and automated ferrous material removal, otherwise the recovery method is manual, massively labor intensive and requires a large facility.

According to other material recovery methods, an initial shredding step is executed, for example to release material from plastic garbage bags. Unfortunately, such a shredding process exposes the recyclable material to break-down and mixing with other material, e.g., breaking of glass, thereby reducing the potential yield available from the input refuse and degrading overall system efficiency. As may be appreciated, to the extent that a material recovery system can avoid degradation or breakage of input material, the resulting yield is increased by maintaining good separation throughout the system of whole items of recyclable material for manual or automatic separation.

Our municipal solid waste, commercial waste, commingled recyclable waste and demolition waste offer great opportunity for material recovery, but such material recovery must be efficient in separating re-usable from non-usable materials, and also in separating re-usable materials from one another. To the extent that such materials can be efficiently separated, the value or profit derived from such material recovery is enhanced. Furthermore, when a greater percentage of re-usable materials are taken, not only is less landfill capacity is needed but we also benefit by re-use of resources otherwise lost to landfill sites.

Accordingly, there exists significant need for high capacity, efficient material recovery systems. Such systems must be cost effective to meet the needs of large municipalities, with mandatory budget constraints, generating large volumes of municipal solid waste and other refuse material. The subject matter of the present invention provides such a solution to refuse material recovery.

SUMMARY OF THE INVENTION

The present invention proposes a systematic approach to material recovery particularly well suited, but not limited to, processing of municipal solid waste, commercial waste, commingled waste, and demolition waste.

In a preferred embodiment of the present invention, a material recovery system provides a primary size classification portion dividing material flow into an unders flow and an overs flow. The overs flow is then subjected to manual picking whereat certain recoverable items are collected. The overs flow is then applied to a density classification portion, a rotary air separator in the preferred embodiment, to produce a lights flow constituting primarily old newsprint items and a heavies flow directed as a landfill output from the system. The unders flow is further subjected to a second size classification portion to produce a second overs flow and a second unders flow. The second overs flow is subjected to a third size classification to produce a third overs flow and a third unders flow. The third unders flow is applied to a second density classification, an air knife in the preferred embodiment, to produce a second lights flows including a good percentage of the aluminum and glass items presented to the system.

The above noted arrangement of size and density classification and intervening manual separation stations offer good opportunity to efficiently extract useable material from a refuse material source. Furthermore, the system includes certain diversion points providing system adaptation to current market condition so as to maximize revenue obtained from the refuse input material.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which:

FIG. 3 illustrates an additional compost processing step which may be added to the material recovery system of FIG. 1.

FIG. 4 illustrates a modification to the size classification mechanism employing a stair-step for improved size classification.

FIG. 5 illustrates an additional processing step providing density classification relative to a landfill output of the material separation system of FIG. 1.

DETAILED DESCRIPTION OF THE PREFERRED EMBODIMENT

Figure 1:
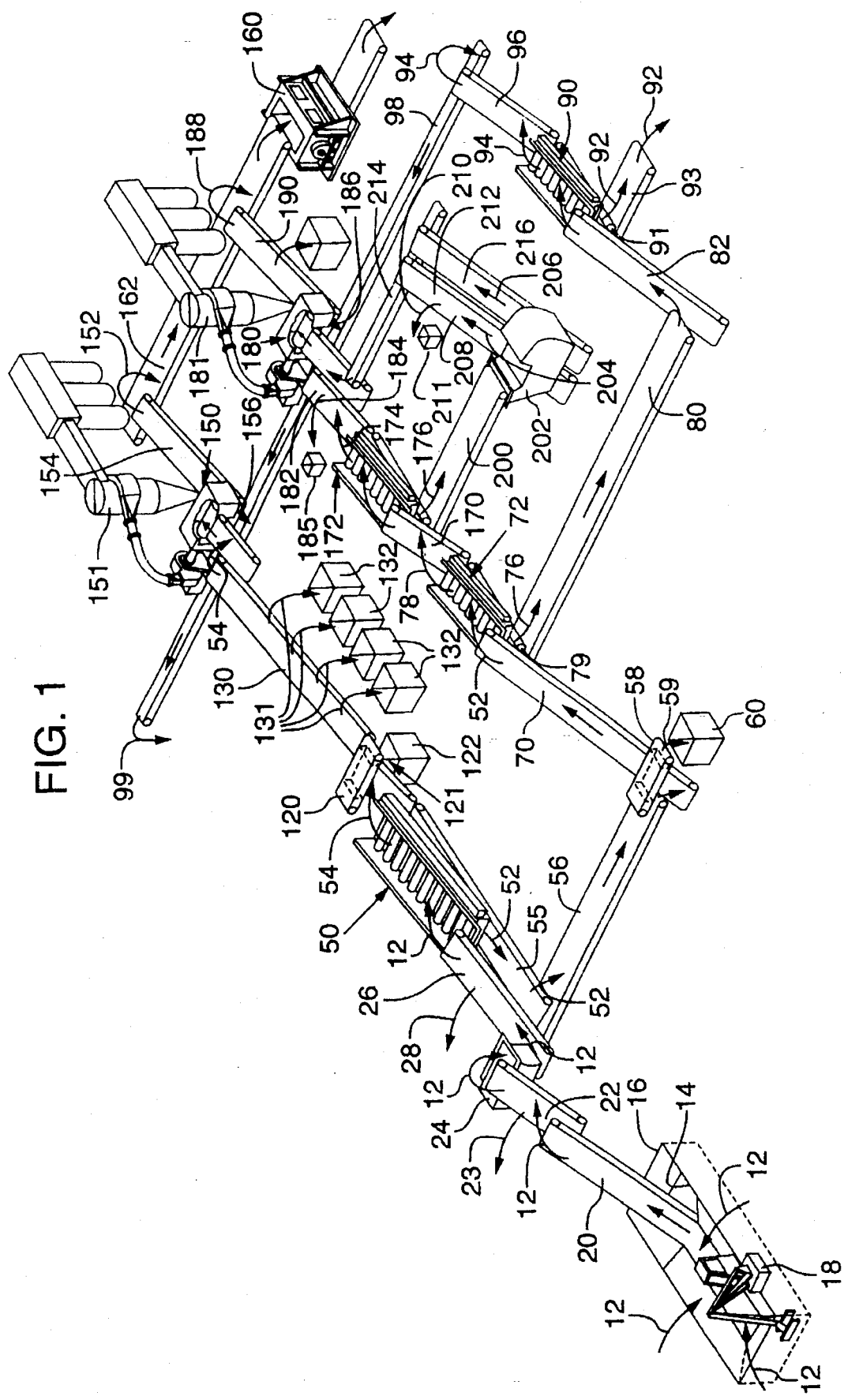
FIG. 1 is a schematic perspective view of a preferred embodiment of the present invention, a material recovery system.

The preferred embodiment of the present invention as illustrated in the drawings is a material recovery system accepting as input a variety of waste sources including, but not limited to, municipal solid waste, commercial waste, commingled recyclable waste, and demolition waste. The system separates this waste input efficiently into valuable re-usable components. For the present discussion, the preferred embodiment of the present invention will be described with reference to processing of municipal solid waste having given percentages of certain reusable and non-reusable material. As may be appreciated, these are merely typical percentage values and actual percentages will vary depending upon the composition of material fed into the recovery system.

The particular embodiment of the present invention will be described with reference to typical municipal solid waste input material comprising 4% ferrous and tin; 3% aluminum; 7% glass including clear, brown, and green glass; 8% old corrugated cardboard; 3% wood; 7% plastic including PETE and HDPE; 14% compost; 30% recyclable/animal bedding/fuel; and 24% landfill material. The efficiency of a material recovery system can be measured against its ability to separate completely these materials from one another. The illustrated embodiment of the present invention is highly efficient in this regard, separating well the various components which make up the input material, in the illustrated case municipal solid waste.

Figure 2A:
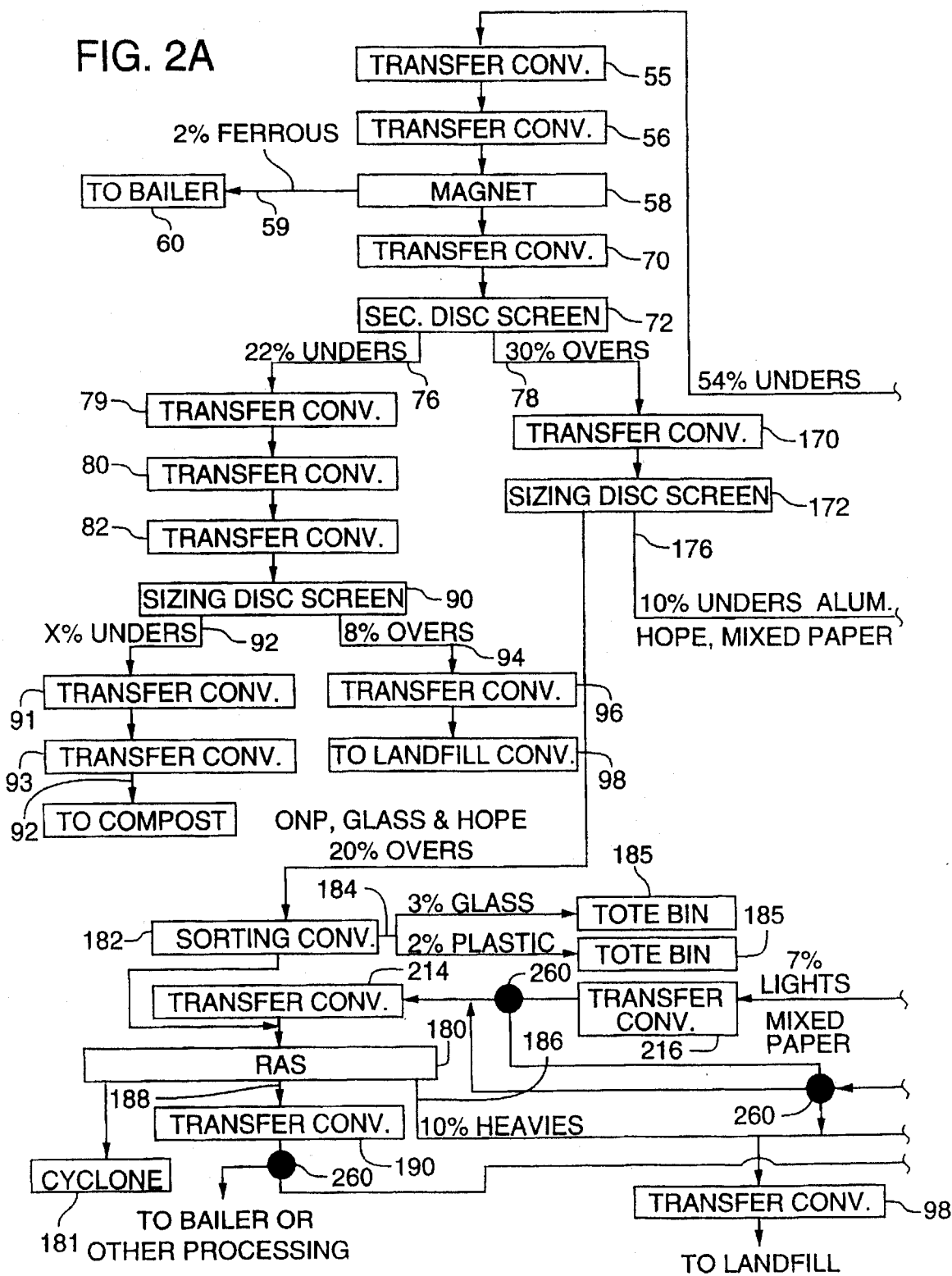
FIG. 2 is a process flow chart depicting material flow and separation under processing by the system of FIG. 1.

FIG. 1 is a schematic isometric perspective view of a material recovery system according to a preferred embodiment of the present invention. As may be appreciated, FIG. 1 is not an exact illustration of a given installation, but rather presented to depict the various components and material flow relationships therebetween. For any given actual installation, the actual layout of the material recovery system may vary according to site constraints such as floor and building dimensions. FIG. 2 is a process flow chart depicting material flow through the components of the material recovery system illustrated in FIG. 1. The flow chart of FIG. 2 illustrates generally the character of material flowing along various paths within the material recovery system of FIG. 1. In particular, percentage values expressed in the flow chart of FIG. 2 correspond to percentages of the original material input. As may be appreciated, these percentage values are only approximations of the actual material flow at any given point, but are illustrative of the type of separation performed by the material recovery system of FIG. 1.

With reference to FIGS. 1 and 2 in conjunction, waste material flow 12 enters a conveyor pit 14 provided in a floor 16. A grapple 18 manipulates material flow 12 within pit 14. Grapple 18 thereby takes from pit 14 any undesirable material detected visually in pit 14 and manipulates or meters material flow 12 for movement onto and along a pit conveyor 20 to a visual inspection picking conveyor 22 where certain material 23 can be visually detected and removed before entering the main portion of system 10. For example, at picking conveyor 22 such undesirable material as ropes, hazardous waste, batteries, and automobile tires can be efficiently removed. Also, workers at picking conveyor 22 can remove recoverable items such as wood and corrugated cardboard items.

Picking conveyor 22 then drops material flow 12 into a bag breaker 24. Bag breaker 24 bursts plastic garbage bags to expose the contents for appropriate processing by system 10. The material recovery art offers a variety of bag breaking mechanisms, any one of which could be used in system 10 to perform this task. Material flow 12 exits bag breaker 24 onto a picking conveyor 26 where persons pull from flow 12 material 28 such as any film plastic, i.e., primarily garbage bags, for delivery to a film plastic baler 30 (FIG. 2 only).

A primary disc screen 50 accepts the flow 12 output, i.e., unselected items, of picking conveyor 26 and provides an initial size classification function with respect to material flow 12. Several such disc screen devices are used in the system 10, each substantially similar in construction, but varied according to a desired size classification function. U.S. Pat. No. 5,051,172 issued Sep. 24, 1991 to Larry J. Gilmore and entitled DISC SCREEN FOR MATERIAL SEPARATION illustrates the construction and operation of the disc screen devices used in system 10. The disclosure of U.S. Pat. No. 5,051,172 is fully incorporated by reference herein. As for the primary disc screen 50, it is suggested that a Duraquip, Inc., Tualatin, Ore., Model No. E-72-28-(3)-7.5 be employed as the primary disc screen 50. Such a disc screen may be configured with a variety of settings, in particular, an IFO set to 5 inch, a slot length set to 5 5/16 inch, a shaft center set to 11 15/16 inch and a disc size of 16 7/8 inch. Generally, the primary disc screen 50 separates articles in material flow 12 into articles with minimum dimension larger than approximately 5 inches, called overs, and articles with minimum dimension less than approximately 5 inches, called unders.

Thus, primary disc screen 50 separates material flow 12 into an unders flow 52, approximately 54% of flow 12, and an overs flow 54, approximately 46% of material flow 12. In general, the unders flow 52 comprises PETE containers, aluminum, smaller plastics, grass clippings, food waste, mixed paper and small glass items. The overs flow 54 comprises, generally, corrugated cardboard, newsprint, large coffee tins, milk jugs, and large glass items. In this manner, primary disc screen 50 establishes a basic division or branching of flow 12 based upon the size of articles in flow 12.

The unders flow 52 then moves along transfer conveyors 55 and 56 to pass below a self-cleaning magnetic overhead conveyor 58. Magnetic conveyor 58 extracts ferrous material 59, typically 2% of material flow 12, from unders flow 52 for diversion to a ferrous baler box 60. The remaining unders flow 52 is directed, via transfer conveyor 70 to a secondary disc screen 72. It is suggested that a Duraquip, Inc., Tualatin, Oregon, Model No. A-48-22-5 disc screen be employed as the secondary disc screen 72. Secondary disc screen 72 has an IFO of 1 inch, slot length of 1 15/32 inch, a shaft center of 7 15/32 inch, and a disc size of 8 1/2 inch. Generally, secondary disc screen 72 separates articles having a minimum dimension of less than approximately 1½ inches from articles having a minimum dimension of greater than approximately 1½ inches.

Secondary disc screen 72 provides, generally, as its unders flow 76 grass clippings, sharps such as needles, broken glass, and food waste. As its overs flow 78, screen 72 delivers junk mail, mixed paper, aluminum, a large portion of whole glass containers, PETE containers, and HDPE plastic items such as juice containers. The unders flow 76 comprises approximately 22% of the material flow 12 while the overs flow 78 is approximately 30% of material flow 12.

The unders flow 76 moves along transfer conveyors 79, 80 and 82 to a sizing disc screen 90. It is suggested that a Duraquip, Inc., Tualatin, Oregon, Model No. A-48-11-3 disc screen be employed as the sizing disc screen 90. Sizing disc screen 90 has an IFO of ¼ inch, slot length of 3 1/32 inch, a shaft center of 7 15/32 inch, and a disc size of 8 1/16 inch. Generally, sizing disc screen 90 separates articles having a smallest dimension of less than ¼ inch from articles having a smallest dimension of greater than 5/16 inch. Sizing disc screen 90 provides, as unders flow 92, such items as small broken glass, grass clippings, and food waste and provides as overs flow 94 larger plastic items. Unders flow 92 moves out of system 10 as a compost base flow 92 and overs flow 94 moves, via conveyor 96, to a landfill conveyor 98 providing a heavies landfill system output 99.

Returning to the overs flow 54 provided by primary disc screen 50, overs flow 54 passes under a self-cleaning magnetic overhead conveyor 120 to direct ferrous material 121, typically approximately 2% of material flow 12, to a ferrous baler bin 122. The remaining overs flow 54 passes along a picking conveyor 130 for separation of recoverable material 131 by picking workers into bins 132 according to such material classifications as old corrugated cardboard, wood, glass of various colors, and plastic. The remainder of overs flow 54, i.e., not taken at the picking conveyor 130, is directed into a rotary air separator 150.

Rotary air separator 150 performs what may be generally characterized as a density classification function. A description of the structure and operation of rotary air separators generally is available in U.S. Pat. No. 4,824,559 issued Apr. 25, 1989 to Larry J. Gilmore and John W. Makin and entitled ROTARY AIR SEPARATOR. The disclosure of U.S. Pat. No. 4,824,559 is hereby incorporated fully by reference. It is suggested that the rotary air separator 150 be implemented as a Duraquip, Inc., Tualatin, Ore., Model No. RAS-48-75 rotary air separator. Rotary air separator 150 provides three outputs as a function of, generally, article density.

Rotary air separator 150 divides overs flow 54 into newspaper flow 152 along conveyor 154 and landfill flow 156 onto the landfill conveyor 98. The least dense material taken from flow 54, essentially dust, passes through a cyclone 151 and is delivered to a collection box (not shown). Newspaper in flow 152 may be optionally delivered to a hammer mill 160 via conveyor 162, or rerouted or directed to other secondary fiber uses such as newspaper recycling uses. The output of hammer mill 160 may be used as fuel, e.g., such as by cubing by die press process, or may be used as animal bedding. The most dense output 156 from rotary air separator 150 comprises generally undesirable items including unopened garbage bags and bundled trash items deposited upon landfill conveyor 98.

Returning to the overs flow 78 provided by secondary disc screen 72, overs flow 78 moves via conveyor 170 to a sizing disc screen 172. It is suggested that sizing disc screen 172 be implemented as a Duraquip, Inc., Tualatin, Oregon, Model No. A-48-11-3. Disc screen 172 has an IFO of 2¾ inch, slot length of 2 31/32 inch, a shaft center of 7 15/32 inch, and a disc size of 10 1/8 inches. Generally, sizing disc screen 172 separates items having a least dimension greater than 2 5/8 inches from items having a least dimension less than 2 7/8 inches.

Sizing disc screen 172 thereby provides an overs flow 174 and an unders flow 176. Overs flow 174 is directed, via sorting conveyor 182, to a rotary air separator 180, similar to rotary air separator 150. Overs flow 174 comprises generally old newsprint, mixed paper, some larger food waste items, PETE, HDPE, a variety of glass containers, diapers and undesirable contaminates which are preferably not handled. Prior to entering rotary air separator 180, however, workers at picking conveyor 182 remove material 184 such as plastic and glass items. The remainder of overs flow 174 enters rotary air separator 180. Rotary air separator 180 separates the unpicked flow 174 into a landfill flow 186 comprising generally the undesirables, contaminants, diapers, and any other non-recoverables. A mixed paper flow 188 of separator 180 moves onto a conveyor 190. The output of conveyor 190, i.e., the mixed paper flow 188, may be optionally diverted onto the conveyor 162 and sent to hammermill 160, or taken as recyclable secondary fiber output from the system 10 at that point. Transfer conveyor 190 also offers good opportunity for material recovery by manual sorting thereat. For example, plastic items may be conveniently removed from conveyor 190. Also, the mixed paper flow 188 may be improved in grade or quality by removing contaminants such as newspaper, plastic, and any other items which would degrade the quality of mixed paper flow 188. Similarly, conveyor 154 may be used as a sorting table if desired.

The unders flow 176 comprises generally aluminum, junk mail, mixed paper, and small plastics. From sizing disc screen 172, the unders flow 176 moves along a conveyor 200 to the input of an air knife 202. Air knife 202 may be implemented as a Duraquip, Inc., Tualatin, Ore., Air Knife Model No. AK-48-15. The function provided by air knife 202 is generally that of separation as a function of article density to produce a heavies flow 204 and a lights flow 206. The heavies flow 204 passes along an eddy current conveyor 208 whereat material 210, e.g., aluminum, are repelled from the eddy current conveyor 208 for delivery to bailer container 211. Down stream from the container ejection point for material 210, a picking line 212 permits manual recovery of such items as HDPE and PETE. The remaining secondary fiber, mixed paper and junk mail, results as the output of conveyor 208 and may be optionally diverted, or sent along a conveyor 214 to the rotary air separator 180. If diverted, the material is placed onto the landfill conveyor 98.

The lights flow 206 from air knife 202 moves along a conveyor 216 and includes generally such items as mixed paper and small plastic items. Flow 206 may be optionally diverted at the output of conveyor 216 to the conveyor 214 for delivery to rotary air separator 180, or to the landfill conveyor 98.

The recovery system 10 as illustrated herein provides an optimum blend of mechanical and manual processes to achieve maximum material recovery. The mechanical and air material separation systems shown are supplemented by hand sorting to improve the quality of products and recovery percentages achieved. The mechanical and automated portions of the system separate the material flow sufficiently to support a simplified and efficient manual sorting task. Thus, while system 10 cannot be characterized as a fully automated system, it is substantially automatic and does reduce significantly the number of people required for operation. For example, the system 10 illustrated in FIG. 1 requires approximately 14 people at the various picking stations illustrated depending on system capacities and market conditions for recoverable materials.

The system is, however, substantially automatic in its manipulation of newspaper items, typically the largest volume single category of recoverable items. This is a significant advantage over manual handling of newspaper items. More particularly, the use of a primary size classification by disc screen 50 followed by manual picking of the primary overs flow allows use of a density classification by the rotary air separator 150 to efficiently extract newspaper items. The same advantage applies to the input to the rotary air separator 180, but with respect to substantially automatic recovery of mixed paper items. Furthermore, use of the rotary air separator 150 in generating the newspaper flow 152 and mixed paper flow 188 eliminates substantially all grit from these flows, making such material more suitable as a cubed fuel source, the fuel cubing dies being particularly susceptible to excess wear when processing grit-contaminated materials.

System 10 supports a throughput capacity, depending on size of implementation, of approximately 10 to 30 tons per hour, considered highly efficient taking into account the relatively small number of people required for operation and the total capacity throughput possible under full operation. As may be appreciated, the system is well suited for handling raw municipal solid waste as described herein, but is equally well suited for commercial waste, commingled recyclable waste, and demolition waste. The percentage of material taken to the landfill is a small percentage of the input material flow 12, and a relatively small percentage as compared to other material recovery systems. For example, in the illustrated example of municipal solid waste as material flow 12, only up to 24% of the material flow 12 is expected to be committed to a landfill. This is a result of the ability of system 10 to extract a good percentage of compost base material, e.g., the flow 92 for use or processing in a separate compost facility.

FIG. 3 illustrates an additional processing step which may be added to system 10 to further enhance compost processing. In FIG. 3, the flow 92 as taken from sizing disc screen 90 moves onto a conveyor 250 for delivery to an air knife 252, similar to air knife 202 previously described. The resulting heavies flow 254 from air knife 252 is an improved or higher grade compost base material relative to that of flow 92, and the lights flow 256 taken from flow 92 may be diverted, e.g., by way of conveyor 98 (FIG. 1) to a landfill. Thus, if enhanced compost processing is desired, air knife 252 may be added to derive higher grade compost base flow 254.

FIG. 4 illustrates an alternative primary disc screen 50' including a first disc screen portion 50a and a down stream second disc screen portion 50b. The disc screen portion 50a is elevated relative to the disc screen portion 50b to provide a drop off portion 50c. Drop off portion 50c can be either a vertical or inclined drop off depending on the nature of material being processed. Drop off portion 50c agitates the flow 12 at the portion 50c and enhances the separation of flow 12 into the overflow 50' and underflow 52', i.e., undersized items are more likely to fall through disc screen 50'. It is suggested, to implement the disc screen 50', that two disc screens 50 be placed in end-to-end relation with an elevational offset therebetween. Furthermore, the entire assembly may be inclined as necessary according to a particular application.

FIG. 5 illustrates an additional processing step which may be applied to the heavies landfill output 99 of FIG. 1. In FIG. 5, the heavies landfill output 99 is applied to the input of a rotary air separator 280. Rotary air separator 280 then provides a heavies output 282 and a lights output 284, the lights output 284 being primarily secondary fiber. The use of rotary air separator 280 as a final processing step to the landfill output 99 provides one last opportunity to derive usable materials from output 99 and to further minimize the volume of material committed to landfill burial. Thus, rotary air separator 280 increases the percentage of secondary fiber recovered as the lights output 284. Such secondary fiber recovered can be baled or processed depending upon prevailing market conditions and represents an opportunity to derive greater revenue from the input material flow 12.

Because the system is easily adapted for variation in material flow, it is possible to implement several optional diversion points within the system as discussed above. System 10 includes four diversion points 260 (FIG. 2) providing diverting stations at strategic locations to give flexibility to system 10 operation. Market price for various recyclable materials can change quickly, so can system 10 to match such dynamic market conditions. Thus, system 10 includes flexibility responsive to recyclable and recoverable material markets to meet present as well as future needs.

It will be appreciated that the present invention is not restricted to the particular embodiment that has been described and illustrated, and that variations may be made therein without departing from the scope of the invention as found in the appended claims and equivalents thereof. For example, it is contemplated that the sizing function provided, particularly that provided by disc screen 90, be optionally performed by a vibrating screening deck for screening the compost base material. The purpose of such a vibrating screening deck in place of disc screen 90 is to remove such items as plastic utensils, plastic lighters, sharps such as hypodermic needles, and other items considered as contaminants with respect to compost base material.

What is claimed is:

1. A refuse material recovery system for receiving a flow of refuse material and extracting therefrom recoverable items, the system comprising:

a primary size classification portion providing an unders flow and an overs flow, the unders flow comprising items generally smaller than a given item dimension magnitude and the overs flow comprising items generally larger than said given item dimension;

a sorting portion including manual sorting facilities receiving said overs flows and providing opportunity for manual sorting of recoverable items from said overs flow;

a density classification portion receiving the remaining uncollected overs flow and providing a heavies flow and a lights flow, the heavies flow being provided as an unusable system output and the lights flow being provided as a usable system output;

a second size classification portion receiving said unders flow and producing a second overs flow and a second unders flow as a function of a second given item dimension magnitude; and a third size classification portion receiving said second overs flow and producing a third overs flow and a third unders flow as a function of a third given item dimension magnitude, the third unders flow being directed to a second density classification portion producing a second heavies flow and a second lights flow, the second heavies flow being applied to an eddy current portion to eject material including aluminum.

2. A system according to claim 1 wherein said system further includes a third density classification portion receiving said third oversight flow and providing a third lights flow and a third heavies flow, the third lights flow being recovered primarily as mixed paper output from said system.

3. A system according to claim 2 wherein said third density classification portion is a rotary air separator device.

4. A system according to claim 1 wherein said second density classification portion is an air knife device.

* * * * *